United States Patent [19]

Spyche, Jr.

[11] Patent Number: 5,598,904
[45] Date of Patent: Feb. 4, 1997

[54] ADJUSTABLE ENERGY ABSORPTION DEVICE

[75] Inventor: Gerald J. Spyche, Jr., West Seneca, N.Y.

[73] Assignee: Enidine, Inc., Orchard Park, N.Y.

[21] Appl. No.: 465,119

[22] Filed: Jun. 5, 1995

[51] Int. Cl.$^6$ .................................................. F16F 9/48
[52] U.S. Cl. ............................... 188/287; 267/221
[58] Field of Search ............................... 188/287, 285, 188/300, 322.13; 267/217, 221

[56] References Cited

U.S. PATENT DOCUMENTS

| 4,044,865 | 8/1977 | Tourunen | 188/287 |
| 4,298,101 | 11/1981 | Dressel, Jr. et al. | 188/287 |
| 4,690,255 | 9/1987 | Heideman | 188/287 |

OTHER PUBLICATIONS

Mecman Catalog Page, "Mecman industrial shock absorbers. Series 370".

*Primary Examiner*—Lee W. Young
*Attorney, Agent, or Firm*—Harris Beach & Wilcox, LLP

[57] ABSTRACT

An adjustable energy absorption device includes an outer cylinder and a shock tube that is rotatably secured within the outer cylinder. The shock tube includes a series of groups of holes passing from the interior to the exterior surface of the tube. The device is also provided with a piston slidably retained within the shock tube for engaging contact with a body in motion. An accumulator for collecting fluid from the interior of the shock tube is provided within the sealed outer cylinder. A spiral groove is formed on the interior wall of the outer cylinder and extends from adjacent the distal end of the cylinder to the accumulator. The spiral groove forms a corresponding land segment between consecutive turns of the groove so that rotation between the shock tube and the outer cylinder moves each group of holes relative to the groove and land to adjustably vary the orifice area between the shock tube and the outer cylinder.

11 Claims, 4 Drawing Sheets

ADJUSTABLE ENERGY ABSORPTION DEVICE

BACKGROUND OF THE INVENTION

1. Field of the Invention

This invention relates in general to energy absorption devices and, in particular, to an adjustable energy absorption device used to dissipate the motion energy of a body in motion. More specifically, but without restriction to the particular embodiment hereinafter described in accordance with the best mode of practice, this invention relates to a series of groups of holes in a shock tube that adjustably engage an internal spiral groove to vary the orifice area in an energy absorption device.

2. Discussion of the Related Art

Numerous mechanical systems require energy absorption devices for dissipating the motion energy of a component element in the system. Such mechanical systems include, for example, pallet stops, rolling doors and refrigeration cases, piston control in air cylinders, medical equipment including CAT scanners, manufacturing transfer and conveyor lines, and industrial robotic equipment. The typical energy absorption device includes a sealed outer cylinder, an internal shock tube, a piston having a head portion and a rod portion for engaging the moving system component, and an accumulator for collecting fluid from the interior of the shock tube when the piston head moves into the tube. The absorption device is also provided with an orifice area that allows passage of fluid from the shock tube to the accumulator as the means for dissipating the energy received by the piston rod. A system of check valves and return passageways is also commonly provided to allow repeated circulation of fluid between the shock tube and the accumulator. After each cycle, the piston head is returned to the beginning of its stroke by a compression coil positioned within the shock tube.

Manufacturers of these energy absorption devices have found it desirable to make the devices adjustable so that they may be readily employed in a variety of mechanical systems. The adjustable feature of the device allows it to effectively dissipate a wide range of energies as directed into the device through the piston rod. In this manner, end users of the devices are given the option of adjusting the device to meet their particular system needs. These types of devices are commonly adjustable to accommodate a shock force of up to 1,000 pounds with a dissipation rating of as high as 650 inch-pounds per cycle.

Providing adjustability to the device has focused on varying the orifice area between the shock tube and the outer cylinder. It is commonly known that the dissipation of larger energies requires a greater orifice area. This absorption capacity is a function of accumulator and fluid volume as well as overall structural integrity of the device. Prior hereto, there has been proposed a number of ways to adjustably vary the orifice area in an energy absorption device of the type described above. One of these prior solutions, for example, includes forming a longitudinal broached slot along the interior surface of the outer cylinder. This broached slot serves as a channel for directing fluid from the shock tube into the accumulator. Fluid is directed into the slot through apertures formed in the shock tube. The orifice area of the apertures is made adjustable by use of spring biased metering pin positioned between the cylinder and the tube. A rotatable bevelled cam is situated at the free end of the pin to longitudinally move the pin across the apertures to thereby adjust the orifice area. Another previously proposed solution for providing adjustability to the orifice area includes using the broached slot in combination with modified shock tube apertures. The apertures are each provided with a tapered channel formed on an arc length segment passing over the aperture around the exterior surface of the shock tube. The tapered channels are thus perpendicularly situated relative to the broached channel. In this manner, when the shock tube is rotated within the cylinder, the distanced between the respective bottoms of the tapered aperture channels and the broached channel is changed thereby varying the orifice area. These prior approaches involve complicated machining operations to form the various required slots and channels, and may additionally include several mechanical parts which are subject to malfunction. Furthermore, fabricating and assembling these numerous mechanical components or scheduling the complicated and time consuming machining operations adds significantly to the cost of producing this type of device.

The hydraulic shock absorber illustrated in U.S. Pat. No. 4,044,865 to Tourunen includes an internal thread and a hole associated with each turn of the internal thread. As the cylinder wall is rotated relative to the sleeve, the orifice area may be adjusted. This type of device, however, requires a number of complicated machined parts for proper operation. In addition thereto, the adjustability of the device is not fine in that relatively small rotations cause substantial changes in the damping characteristics.

OBJECTS AND SUMMARY OF THE INVENTION

It is, therefore, an object of the present invention to improve energy absorption devices.

Another object of this invention is to minimize use of mechanical components in providing adjustability to the orifice area in an energy absorption device.

It is a further object of the present invention to reduce the number of machining operations required in providing adjustability to the orifice area in an energy absorption device.

Still another object of the present invention is to utilize a square thread easily formed on the interior surface of the outer cylinder of an energy absorption device to direct fluid from the shock tube of the device to the accumulator thereof.

It is yet a further object of the present invention to employ a series of groups of holes, the holes being readily formed in the shock tube of an energy absorption device to interact with consecutive turns of a square thread formed on the interior surface of the outer cylinder of the device to thereby adjustably vary the orifice area between the tube and the cylinder.

An additional object of the present device is to change the damping force characteristics of an energy absorption device by requiring relatively large rotations between the outer cylinder and the shock tube of the device to thereby slowly modify the orifice area to allow fine tuning of the damping force characteristics.

These and other objects are attained in accordance with the present invention wherein there is provided an adjustable energy absorption device for dissipating the motion energy of a moving element in a mechanical system. The device includes an outer cylinder and a shock tube that is rotatably secured within the outer cylinder. In accordance with one aspect of the present invention, the shock tube includes an interior surface, an exterior surface, and a series of groups of holes passing from the interior to the exterior surface of the shock tube. The present device is also provided with a piston including a head portion and a rod portion. The piston head is slidably retained within the shock tube while the piston rod extends from the piston head through the proximal end of the outer cylinder for engaging contact with the body in motion. An accumulator for collecting fluid from the interior of the shock tube is provided within the sealed outer cylinder. In accordance with another aspect of this invention, a spiral groove is formed on the interior wall of the outer cylinder. The spiral groove extends from adjacent the distal end of the cylinder to the accumulator. The spiral groove forms a corresponding land segment between consecutive turns of the groove so that rotation of the shock tube relative to the outer cylinder moves each group of holes relative to the groove from a position where all the holes in each group open into the groove to a position where all the holes are blocked by a respective portion of the land segment. In this manner, the orifice area can be varied to adjustably change the rate of fluid flow out of the interior of the shock tube.

BRIEF DESCRIPTION OF THE DRAWING

Further objects of the present invention together with additional features contributing thereto and advantages accruing therefrom will be apparent from the following description of a preferred embodiment of the invention which is shown in the accompanying drawing with like reference numerals indicating like components throughout, wherein.

DETAILED DESCRIPTION OF A PREFERRED EMBODIMENT

Figure 1:
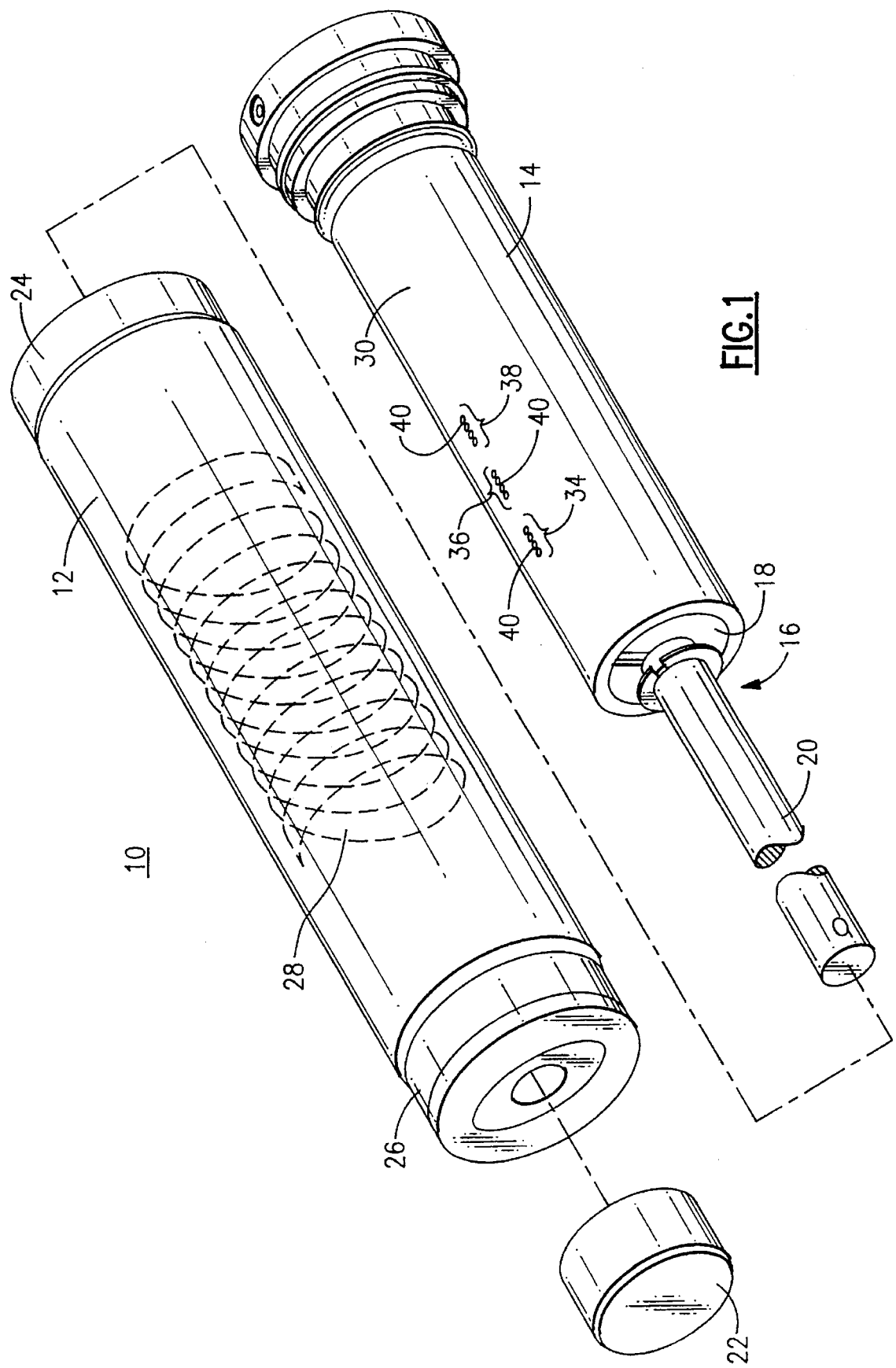
FIG. 1 is an exploded perspective view of an energy absorption device according to the present invention.
Figure 2:
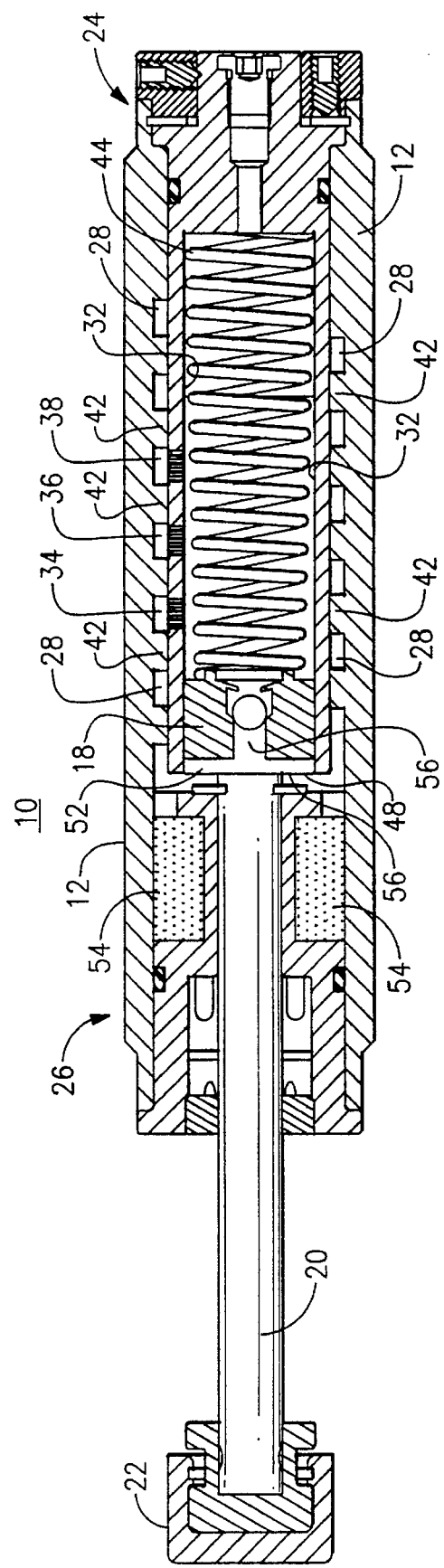
FIG. 2 is a longitudinal sectional view of the present device shown adjusted to maximum orifice area with the piston at rest.
Figure 3:
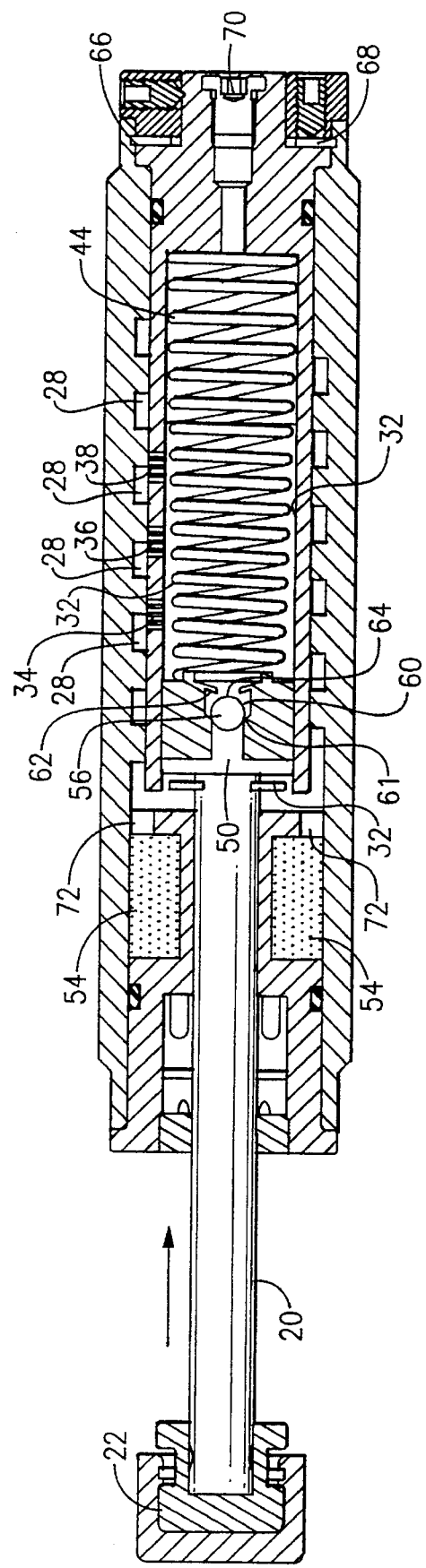
FIG. 3 is a view similar to FIG. 2 showing the present device adjusted to an intermediate orifice area with the piston partially displaced into the shock tube.
Figure 4:
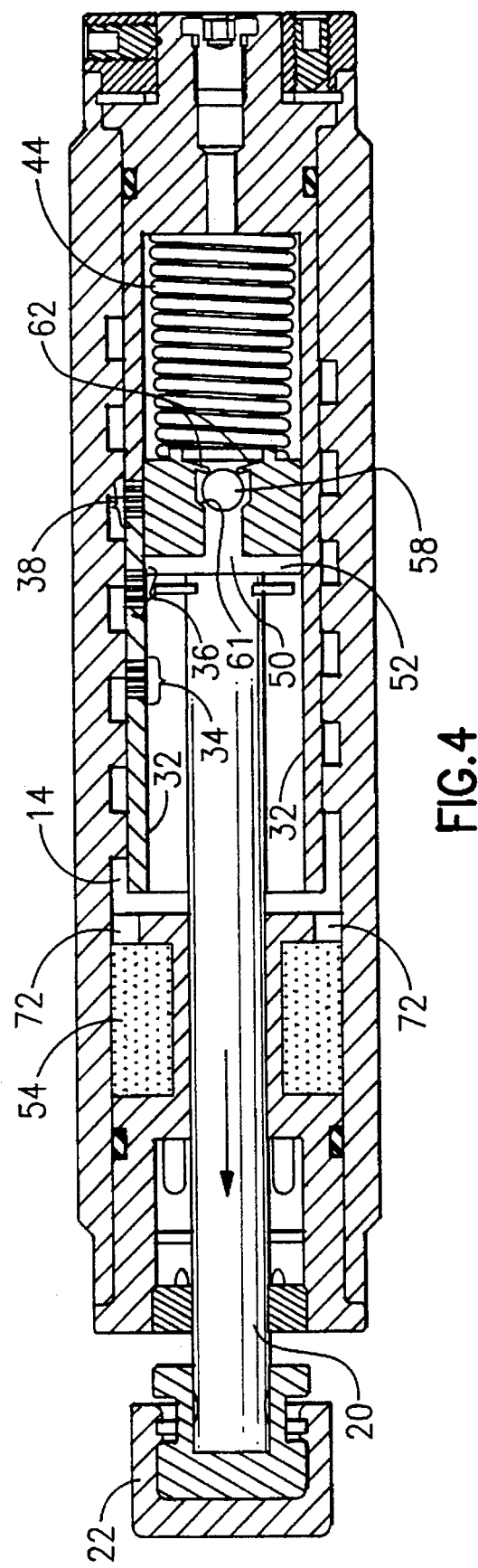
FIG. 4 is a longitudinal sectional view of the device of FIG. 3 showing the return stroke of the piston by a compression spring as utilized in conjunction with the present invention.

Referring now to the drawing and initially to FIG. 1, there is shown in accordance with the present invention an energy absorption device generally referenced 10. The device 10 includes an outer cylinder housing member 12 and a shock tube 14. The shock tube 14 includes a piston 16 having a piston head 18 and a piston rod 20. The outer cylinder 12 includes a distal end 24 and a proximal end 26. After assembly of the shock tube 14 and within the outer cylinder 12 so that the piston rod 20 extends out of the proximal end 26, a contact knob 22 is secured to the rod 20. The contact knob 22 is for engaging contact with a moving component of a mechanical system in which the device 10 is employed to dissipate motion energy. The contact knob 22 may be of any suitable form and may be permanently engaged with the moving component or left free to contact the moving component only upon impact. The interior wall of the outer cylinder 12 is provided with a spiral groove or square thread 28 which is positioned therein as shown in FIG. 1. The shock tube 14 includes an exterior surface 30 with a corresponding interior surface 32 as best shown in FIGS. 2–4. Referring again to FIG. 1, it is shown that the shock tube 14, in accordance with the present invention, is provided with a series of groups of holes including a first group of holes 34, a second group of holes 36, and a third group of holes 38. Each group of holes is comprised of individual holes 40. In the preferred embodiment of the present invention, there is provided the three groups of holes 34, 36, and 38 with each group having four individual holes 40. It is to be understood, however, that the present invention is not limited to three groups of holes including four holes each, but may be readily adapted to include any suitable number of groups and holes provided therein. The holes 40 pass from the interior surface 32 to the exterior surface 30 of the shock tube 14 and provide a maximum orifice area which is adjustable as will be described in further detail below. This maximum available orifice area is a function of the total number of holes 40 and their respective diameters.

With reference now to FIG. 2, there is shown that the spiral groove 28 includes a corresponding land segment 42. The shock tube 14 is allowed to freely rotate relative to the outer cylinder 12 and is shown rotated to a position where each group of holes 34, 36, and 38 are aligned and in complete registration with a respective segment of the spiral groove 28. In this manner, the orifice area is set to a maximum so that all of the available surface area of the holes 40 is utilized to direct fluid contained within the shock tube 14 into the spiral groove 28. FIG. 2 also shows that the piston head 18 includes a front face 46 and a back face 48. A passageway 50 is provided through the piston head 18 while a slot 52 is formed along a diameter of the back face 48 thereof. In addition, the proximal end 26 of the outer cylinder 12 is provided with a fluid accumulator 54. The piston rod 20 is prevented from sliding completely through the accumulator 54 by a retaining ring 56 which engages the accumulator 54 to prevent further displacement of the rod through the accumulator.

FIG. 3 shows that a check valve ball 58 is contained within a chamber 60 formed in the passageway 50. The chamber 60 includes a shoulder portion 61. The chamber 60 also includes a cone-shaped seat 62 with an opening 64 formed in the apex thereof to allow fluid to pass from the accumulator 54, through the slot 52, into the passageway 50, around the check valve ball 58, and into the shock tube 14. FIG. 3 shows the groups of holes 34, 36, and 38 adjusted to an intermediate position with two of the holes in each group opening into the spiral group 28 and the other two holes in each group being blocked by the corresponding land segment 42. Once the adjustment has been made to a desired orifice area, which in FIGS. 3 and 4 is half of the maximum available orifice area shown in FIG. 2, a set screw 68 is secured against a rotating ring 66 to prevent further rotation of the shock tube 14 relative to the outer cylinder 12. Lastly, a fill plug 70 is provided in the distal end of the device 10 to provide access to the interior of the device which is filled with hydraulic fluid such as oil.

The device 10 dissipates energy received by the contact knot 22 and transferred into the device to the piston head 18 by the piston rod 20 by moving hydraulic fluid contained within the device through the holes 40 and into the spiral groove 28. FIG. 3 represents displacement of the piston rod 20 into the device as the rod 20 moves inward. At this point in the cycle of the piston 16, the check valve ball 58 will seat against the shoulder 61 of the chamber 60 preventing fluid from passing out of the shock tube through the passageway 50. The compression coil 44 will begin to compress while the fluid within the shock tube will be forced through the holes 40 and into the spiral groove 28. Once in the spiral groove 28, the fluid will travel down the groove and into the accumulator 54 through inlet ports 72. As fluid is forced through the groups of holes which have been adjusted to the intermediate position shown in FIG. 3, the energy received by the contact knob 22 is thereby dissipated in the form of heat.

FIG. 4 shows the piston rod 20 being displaced from within the shock tube 14 as the compression coil 44 begins to expand after the energy on the contact knob 22 has been dissipated. As the piston 16 is displaced out of the shock tube 14 as represented in FIG. 4, the check valve ball 58 will unseat from the shoulder 61 of the chamber 60 and allow fluid from the accumulator 54 to pass through the slot 52, down the passageway 50, around the check ball 58, and back into the part of the shock tube 14 on the right of the front face 48. As the piston head 18 moves back past the groups of holes 34, 36, and 38, fluid remaining in the spiral groove will also be drawn into the interior of the shock tube 14 in a controlled manner.

According to certain advantages of the energy absorption device 10 over the prior art, the consecutive turns of the spiral groove 28 are spaced at a predetermine distance relative to the series of holes 34, 36, and 38 so that relatively large rotations between the shock tube 14 and the outer cylinder 12 are required to make a small change in the orifice area. It is presently contemplated that a quarter turn between the shock tube 14 and the outer cylinder 12 would preferably result in approximately a 50% change in orifice area. In this manner, the orifice area is incrementally changed in very small steps so that the damping characteristics can be fine tuned. An individual adjusting the device will have an easier time making desired adjustments while avoiding the aggravation of having to make considerable changes in damping force characteristics in very small degrees of rotation. An alternative manner for achieving the present advantages involves making the diameter of each hole in the series of holes 34, 36, and 38 relatively small in relation to the width of the spiral groove 28 so that relatively large rotations between the shock tube 14 and the outer cylinder 12 are required to make a small change in the orifice area. This also requires providing a predetermined distance between the holes 40 as related to the width of the spiral groove 28.

There has thus been shown and described an energy absorption device 10 which provides adjustable by use of easily formed groups of holes in the shock tube which engage the spiral groove 28. The orifice area of the device is easily adjusted by rotation of the shock tube within the outer cylinder 12 which will move the groups of holes, relatively, between the groove and the corresponding land segment so that the orifice area can be adjusted from a maximum area to zero. It is to be understood that the maximum orifice area is a function of the total number of holes in each group and the diameter of each hole in the series. The groups of holes 34, 36, and 38 are formed by a simple drilling operation while the spiral groove or square thread 28 is formed by a quick and uncomplicated threading process well known in the art. Thus, the device 10 requires a minimum of mechanical parts and only simple machining operations to provide an adjustable orifice area.

While this invention has been described in detail with reference to a certain preferred embodiment, it should be appreciated that the present invention is not limited to that precise embodiment. For example, any suitable number of groups of holes may be employed in accordance with this invention. Furthermore, any suitable number of holes in each group may be employed while the holes in each group may advantageously be provided with a range of differing diameters rather than a common diameter. Thus, in view of the present disclosure which describes the best mode for practicing the invention, many modifications and variations would present themselves to those of skill in the art without departing from the scope and spirit of this invention, as defined in the following claims.

What is claimed is:

1. An adjustable energy absorption device for dissipating the motion energy of a body in motion, said device comprising:

an outer cylinder housing member having a distal end, a proximal end, and an interior wall;

a shock tube being rotatably secured within the outer cylinder and having an interior surface, an exterior surface, and a series of holes formed in groups, each group having a predetermined number of sequential holes providing an orifice area, each hole passing from the interior surface to the exterior surface of the tube to allow fluid to pass therethrough;

a piston including a head portion and a rod portion, said head portion being slidably retained within said shock tube and said rod portion extending from the piston head portion through the proximal end of the outer cylinder for engaging contact with the body in motion;

an accumulator, contained within the outer cylinder, for collecting fluid from the interior of said shock tube when said piston head portion moves into the tube; and a spiral groove having turns therein formed on the interior wall of the outer cylinder, said spiral groove extending from adjacent the distal end of the cylinder to said accumulator, and having a corresponding land segment formed between consecutive turns of the groove so that relative rotation between said shock tube and the outer cylinder moves said series of holes relative to the groove from a position where each group of sequential holes opens into a separate corresponding turn of the groove to a position where all the holes are blocked by the land segment thereby varying the orifice area such that relative rotation between said shock tube and the outer cylinder from a position where all holes are open to a position where all holes are closed causes successive holes in each hole group to be sequentially blocked until all holes are blocked to adjustably change the rate of fluid flow out of the interior of said shock tube.

2. The device according to claim 1 wherein said shock tube is retained within the outer cylinder so that said exterior surface of the tube is in sliding contact with the interior wall of the outer cylinder.

3. The device according to claim 1 wherein substantially all of said spiral groove has a constant depth and a square bottom in cross section.

4. The device according to claim 1 wherein said accumulator is contained within the proximal end of said outer cylinder housing member.

5. The device according to claim 1 wherein said outer cylinder housing member includes set screw means for rigidly securing the outer cylinder relative to said shock tube so that a predetermined orifice area is maintainable between the tube and the cylinder.

6. The device according to claim 1 wherein the orifice area varies between zero and a predetermined maximum area that is a function of the number of holes passing through said shock tube and their respective diameters.

7. The device according to claim 1 further including a compression spring positioned between the piston head portion and the distal end of the cylinder so that after the piston is displaced into said shock tube by engagement with the moving body, said compression spring will return the piston to the beginning of its stroke.

8. The device according to claim 7 wherein the head portion of said piston includes a passageway with a sealing ball movably retained therein so that when the piston is displaced into said shock tube, fluid flows through the grouped holes into the accumulator, and when the piston is displaced out of the shock tube by said compression spring, fluid is drawn from said accumulator and moved through said passageway back into the shock tube.

9. The device according to claim 8 wherein said outer cylinder housing member is sealed to prevent fluid leakage therefrom.

10. The device according to claim 1 wherein said consecutive turns of said spiral groove are spaced at a predetermine distance relative to said series of holes so that relatively large rotations between said shock tube and said outer cylinder are required to make a small change in said orifice area.

11. The device according to claim 1 wherein the diameter of each hole in said series of holes is relatively small in relation to the width of said spiral groove so that relatively large rotations between said shock tube and said outer cylinder are required to make a small change in said orifice area.

* * * * *